US006998779B2

(12) United States Patent
Choi

(10) Patent No.: US 6,998,779 B2
(45) Date of Patent: Feb. 14, 2006

(54) PLASMA DISPLAY DEVICE

(75) Inventor: Seo-Young Choi, Yongin (KR)

(73) Assignee: Samsung SDI Co., Ltd., Suwon (KR)

( * ) Notice: Subject to any disclaimer, the term of this patent is extended or adjusted under 35 U.S.C. 154(b) by 126 days.

(21) Appl. No.: 10/771,702

(22) Filed: Feb. 4, 2004

(65) Prior Publication Data
US 2004/0251832 A1 Dec. 16, 2004

(30) Foreign Application Priority Data
Jun. 10, 2003 (KR) ............... 10-2003-0037113

(51) Int. Cl.
H01J 17/49 (2006.01)
(52) U.S. Cl. ..................... 313/582; 313/486
(58) Field of Classification Search ........ 313/438–487, 313/581–582
See application file for complete search history.

(56) References Cited

FOREIGN PATENT DOCUMENTS

| JP | 2001-236893 | 8/2001 |
|---|---|---|
| JP | 2003-7215 | 1/2003 |
| KP | 2001-0062387 | 7/2001 |
| KR | 2000-0060401 | 10/2000 |

OTHER PUBLICATIONS

Korean Patent Abstract, Publication No. 1020000060401, Publication Date Oct. 16, 2000, Published in the name of Kim, et al.
Korean Patent Abstract, Publication No. 1020010062387, Publication Date Jul. 7, 2001, Published in the name of Haruki, et al.
Patent Abstract of Japan, Publication No. 2003-007215, Publication Date Jan. 10, 2003, Published in the name of Kawamura.
Patent Abstracts of Japan for Publication No. 2001-236893, date of publication Aug. 31, 2001, in the name of Haruki Shigero et al.

Primary Examiner—Vip Patel
(74) Attorney, Agent, or Firm—Christie, Parker and Hale, LLP

(57) ABSTRACT

A plasma display panel. A pair of substrates has a transparent front surface and is disposed to leave a discharge space therebetween. A plurality of barrier ribs is disposed on one substrate to partition the discharge space into a plurality of respective green discharge spaces, blue discharge spaces and red discharge spaces. A group of electrodes is disposed on the substrates to discharge in the discharge spaces partitioned by the barrier ribs. A phosphor layer is formed in the discharge spaces, the phosphor layer being a green phosphor layer for the green discharge spaces, a blue phosphor layer for the blue phosphor discharge spaces, and a red phosphor layer for the red discharge spaces. A discharge gas is filled in the discharge spaces, wherein the green phosphor layer comprises from 10 to 70% by weight of a first green phosphor selected from the group consisting of $Zn_2SiO_4$:Mn, $(Zn, A)_2SiO_4$:Mn (where A is an alkali metal), and mixtures thereof; from 0 to 30% by weight of a second green phosphor selected from the group consisting of (Ba, Sr, Mg)O.a$Al_2O_3$:Mn (where a is from 1 to 23), $LaMgAl_xO_y$:Tb,Mn (where x is from 1 to 14 and y is from 8 to 47), and mixtures thereof; and from 20 to 70% by weight of a third green phosphor selected from the group consisting of $ReBO_3$:Tb (where Re is at least one rare earth element selected from the group consisting of Sc, Y, La, Ce, and Gd), and wherein the discharge gas comprises at least 6% by weight of Xe based on the total weight of the discharge gas.

20 Claims, 1 Drawing Sheet

PLASMA DISPLAY DEVICE

CROSS REFERENCE TO RELATED APPLICATION

This application claims priority to and the benefit of Korean patent application No. 2003-37113 filed in the Korean Intellectual Property Office on Jun. 10, 2003, the entire disclosure of which is incorporated herein by reference.

BACKGROUND OF THE INVENTION (a) Field of the Invention

The present invention relates to a plasma display panel, and particularly to a plasma display panel whose discharge efficiency is improved by employing a discharge gas having a high xenon (Xe) percentage, and the green brightness and lifespan characteristics are remarkably improved by increasing amounts of the green phosphor in proportion to the increase of the Xe percentage.

(b) Description of the Related Art

A plasma display panel (PDP) is a flat display device using a plasma phenomenon, which is also called a gas-discharge phenomenon since a discharge is generated in the panel when a potential greater than a certain level is applied to two electrodes separated from each other under a gas atmosphere in a non-vacuum state. Such gas-discharge phenomenon is applied to display an image in the plasma display panel.

A modern generally used plasma display panel is an alternating current (AC) driven plasma display panel, as shown in FIG. 1. The AC plasma display device has a fundamental structure in which front substrate 1 is disposed facing back substrate 3, with discharge space 5 between the two substrates. On front substrate 1, a pair of retaining electrodes (scanning electrode X, common electrode Y) is formed in a predetermined pattern, composed of transparent electrode 7 and metal film 9. Dielectric layer 11 is also coated thereon for the AC driving. The surface of dielectric layer 11 is coated with MgO passivation layer 13. On back substrate 3, address electrode A, dielectric layer 15, barrier rib 17, and phosphor layers 19R, 19G, 19B are formed.

The front substrate is disposed facing the back substrate and sealed. The internal space thereof is evacuated to reach a vacuum state, and the discharge gas is injected therein. The discharge gas may include any one or a mixture of inert gasses such as He, Ne, or Xe. The conventional discharge gas has 4–5% Xe content by weight, while it is currently being suggested to increase the Xe percentage in order to improve the photoemission efficiency. However, when the Xe percentage is excessively increased, it causes problems in that the lifespan of phosphors is decreased and the discharge voltage is increased.

Typically, the phosphor used for the PDP is a phosphor that is excited by ultraviolet rays. As the green phosphor has the highest percentage of white brightness among red (R), green (G), and blue (B) phosphors, the green brightness is the most important for improving the PDP brightness. Currently, $Zn_2SiO_4$:Mn and $BaAl_{12}O_{19}$:Mn are used for the green phosphor, and $Zn_2SiO_4$:Mn is the most popular due to its better brightness characteristics. However, it also is problematic in that the discharge characteristics are degenerated. The reason why the discharge characteristics of $Zn_2SiO_4$:Mn are degenerated will now be described in detail.

As shown in FIG. 1, since MgO layer 13 of front substrate 1 and phosphor layers 19R, 19G, 19B of back substrate 3 are directly exposed to the discharge space, the secondary electron emission coefficient of the MgO layer and the surface charge of the phosphor layer are directly affected by the amount of wall charge piled up on the phosphor layer and the MgO layer.

The phosphor layer has a different component composition depending on color. The surface electrification characteristics are also varied depending upon the kind of the material. During positive surface electrification, discharge failure rarely occurs, while during negative surface electrification, inferior discharge frequently occurs. This tendency is highly dependant on the driving system. In order to increase the discharge stability and to decrease the inferior discharge, it is preferable to select the R, G, B phosphor so that the surface electrification characteristic is positive regardless of the R, G, B color. Nevertheless, $Zn_2SiO_4$:Mn, the most popular green phosphor, has a negative surface electrification characteristic. Accordingly, when the PDP is driven by a driving waveform sensitive to the surface electrification characteristics of the phosphor layer, that is, the variation of the back substrate, the discharge voltage of the green cell becomes higher than those of the red cell and the blue cell.

The mechanism to increase the discharge voltage may be described as follows: upon the reset discharge, the characteristic of driving an alternating current plasma display during the real discharge, that is, before the discharge voltage is applied to the address electrode terminal, the wall charge is piled up. Before the discharge voltage is applied to the address electrode terminal, the wall charges having counter polarities are respectively piled up on the front substrate and the back substrate. Thereby, a voltage differentiation is generated between the front and back substrates.

Upon the voltage differentiation reaching a certain level, a voltage having the same polarity as the wall charge piled up on both the address electrode terminal and the scanning electrode terminal is applied to discharge. Thereby, the address discharge voltage is lowered by effectively piling the wall charge at an appropriate level. Before the discharge voltage is applied to the address electrode terminal, the cations pile up on the surface of the phosphor layer of the back substrate as a wall charge. As the $Zn_2SiO_4$:Mn having negative surface electrification characteristics is counterbalanced by the wall charge of cations, the green cell generates a smaller discharge voltage that those of the red cell and blue cell. Accordingly, the green cell of $Zn_2SiO_4$:Mn may require a higher address voltage compared to that of the red cell and the blue cell, and sometimes, discharge failure occurs.

In order to solve the problems relating to $Zn_2SiO_4$:Mn, Korean Patent Laid-Open Publication No. 2001-62387 discloses a green phosphor in which $YBO_3$:Tb is added to $Zn_2SiO_4$:Mn. However, the obtained green phosphor has deteriorated color purity. Further, Korean Patent Laid-Open Publication No. 2000-60401 discloses a green phosphor in which a positive charged material of zinc oxide and magnesium oxide is added to $Zn_2SiO_4$:Mn. However, the green phosphor obtained from this method also causes problems in that the color purity and the lifespan are deteriorated. Further, Japanese Patent Laid-Open Publication No. 2003-7215 discloses that a mixture of manganese-activated aluminate green phosphor and terbium-activated phosphate or terbium-activated borate green phosphor can improve the driving voltage and the brightness failure. Nonetheless, it cannot improve the persistence of the green phosphor.

The above mentioned green phosphors exhibit a somewhat satisfactory brightness characteristic in the case of the discharge gas charged to the PDP being a 4–5% Xe percentage. On the other hand, in a high photoemission efficient PDP in which the Xe percentage is more than 6%, the phosphors do not exhibit a satisfactory brightness characteristic. Therefore, there is a need for a phosphor exhibiting good brightness and a good lifespan characteristic in discharge gas having a high Xe percentage.

SUMMARY OF THE INVENTION

In accordance with the present invention a plasma display panel is provided having a phosphor exhibiting good brightness and good lifespan characteristics in a discharge gas having a high Xe percentage. A plasma display panel is also provided having a phosphor capable of exhibiting good photoemission stability and good color purity while improving the persistence.

In accordance with the present invention a plasma display panel has a pair of substrates having a transparent front surface and disposed to leave a discharge space therebetween. A plurality of barrier ribs is disposed on one substrate to partition the discharge space into a plurality of respective green discharge spaces, blue discharge spaces and red discharge spaces. A group of electrodes is disposed on the substrates to discharge in the discharge spaces partitioned by the barrier ribs. A phosphor layer is formed in the discharge spaces, the phosphor layer being a green phosphor layer for the green discharge spaces, a blue phosphor layer for the blue phosphor discharge spaces, and a red phosphor layer for the red discharge spaces. A discharge gas is filled in the discharge spaces, wherein the green phosphor layer comprises: 10–70% by weight of a first green phosphor selected from the group consisting of $Zn_2SiO_4$:Mn, $(Zn, A)_2SiO_4$:Mn (A being an alkali metal), and mixtures thereof; 0–30% by weight of a second green phosphor selected from the group consisting of $(Ba, Sr, Mg)O.aAl_2O_3$:Mn (where a is from 1 to 23), $LaMgAl_xO_y$:Tb,Mn (where x is from 1 to 14, and y is from 8 to 47), and mixtures thereof; and 20–70% by weight of a third green phosphor selected from the group consisting of $ReBO_3$:Tb (where Re is at least one rare earth element selected from the group consisting of Sc, Y, La, Ce, and Gd), wherein the discharge gas comprises at least 6% Xe by weight based on the total weight of the discharge gas.

DETAILED DESCRIPTION

Figure 1:
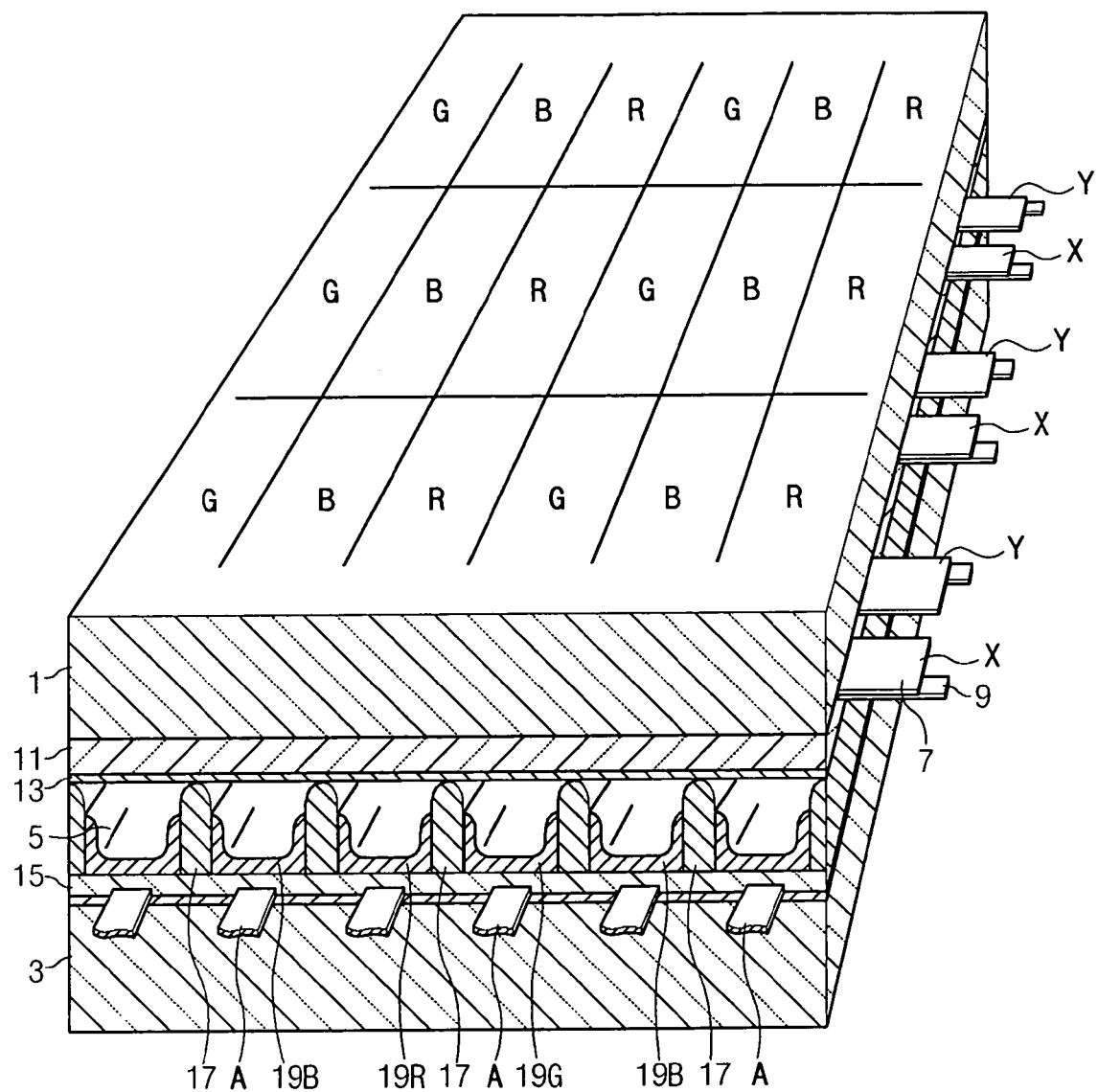
FIG. 1 is a perspective view showing the internal structure of the plasma display panel according to the present invention.

The present invention relates to a plasma display panel comprising a phosphor capable of improving the brightness and the lifespan characteristics in a discharge gas having a high Xe percentage such as 6% or more, and in one embodiment 6 to 50%. The Xe percentage in another embodiment is 6 to 30%, in still another embodiment 7 to 20%, in yet another embodiment 10 to 20%, and in a still further embodiment 10 to 15%. The vacuum ultraviolet (VUV) which excites the phosphor is dispersed depending upon the proportion of the Xe percentage in a discharge gas. In other words, since, upon employing a higher Xe percentage, the contribution degree of the exciting source is increased to 173 nm compared to the case of 147 nm, it is preferable to select phosphors exhibiting the photoemission efficiency at 163–183 nm. In this regard, the brightness and the lifespan characteristics can be improved in a discharge gas having a high Xe percentage by adding $ReBO_3$:Tb (Re being at least one rare earth element selected from the group consisting of Sc, Y, La, Ce, and Gd) having a high photoemission efficiency at 163–183 nm to a green phosphor of $Zn_2SiO_4$:Mn or $(Zn,A)_2SiO_4$:Mn (A is an alkali metal) at a certain ratio.

The green phosphor comprises $Zn_2SiO_4$:Mn, $(Zn,A)_2SiO_4$:Mn (where A is any alkali metal element) or mixtures thereof at an amount from 10 to 70% by weight, in one embodiment 20 to 60% by weight, and in another embodiment 30 to 50% by weight; $(Ba, Sr, Mg)O.aAl_2O_3$:Mn (where a is from 1 to 23), or $LaMgAl_xO_y$:Tb,Mn (where x is from 1 to 14, and y is from 8 to 47) at an amount from 0 to 30% by weight, in still another embodiment 5 to 25% by weight, and yet another embodiment 10 to 20% by weight; and $ReBO_3$:Tb at an amount from 20 to 70% by weight, in a still further embodiment 25 to 65% by weight, and in another embodiment 35 to 55% by weight.

The relative brightness of the three kinds of green phosphors may be changed depending upon the composition of the discharge gas. Under the condition of Xe=6% or more, the brightness of the green phosphor is increased by increasing the amount of $ReBO_3$:Tb. However, the color purity is degenerated if the amount of $ReBO_3$:Tb is excessively increased, and the range of color regeneration is narrower.

Accordingly, the present invention controls the Xe percentage and the amount of each green phosphor to $200 \leq x+y+az \leq 2130$, in another embodiment $380 \leq x+y+az \leq 2130$, and in still another embodiment $520 \leq x+y+az \leq 1080$. In the formula, x is an amount of the first green phosphor selected from the group consisting of $Zn_2SiO_4$:Mn, $(Zn,A)_2SiO_4$:Mn (where A is an alkali metal) and mixtures thereof; y is an amount of the second green phosphor selected from the group consisting of $(Ba, Sr, Mg)O.aAl_2O_3$:Mn (where a is from 1 to 23), $LaMgAl_xO_y$:Tb,Mn (where x is from 1 to 14, and y is from 8 to 47), and mixtures thereof; z is an amount of the third green phosphor represented by $ReBO_3$:Tb (where Re is at least one rare earth element selected from the group consisting of Sc, Y, La, Ce, and Gd), and a is the Xe percentage (%) in the total discharge gas. By using the mixture of three kinds of green phosphors, it is possible to accomplish good brightness and good lifespan characteristics as well as good color purity.

The three kinds of green phosphors are mixed in a certain ratio and dispersed in a vehicle dissolving a binder resin in a solvent to provide a phosphor paste. The binder resin may include, but is not limited to, a cellulose-based resin such as ethyl cellulose and acryl resin. The solvent may include, but is not limited to, hexane triol, polypropylene glycol, butyl carbitol acetate, terpineol, and so on. The dispersion method to prepare the phosphor paste may include any conventional method as long as the dispersion is performed.

The obtained phosphor paste is coated on the surface to provide a phosphor layer. The surface to be coated is dielectric layer 15 on the surface of back substrate 3 and side wall of barrier rib 17 as shown in FIG. 1. The coating method of the phosphor paste may include, but is not limited to, screen printing or spraying the phosphor paste from a nozzle. The coated paste layer is then sintered at a temperature sufficient to discompose or burn the binder resin, to provide a phosphor layer.

The following examples illustrate the present invention in further detail. However, it is understood that the present invention is not limited by these examples.

EXAMPLES $Zn_2SiO_4:Mn$, $(Ba,Sr,Mg)O.Al_2O_3:Mn$, and $YBO_3:Tb$ were mixed at each composition ratio shown in Table 1 to prepare a green phosphor for a plasma display panel. The green phosphor was dispersed in a vehicle in which ethyl cellulose was dissolved in butyl carbitol acetate to obtain a phosphor paste. The phosphor paste was screen-printed between barrier ribs shown in FIG. 1 and sintered at 500° C. to provide a phosphor layer. The relative brightness was measured using an exciting source at 146 nm when Xe was between 5% and 15%. The results are shown in Tables 1 and 2.

Example 1) or the cases of mixing three kinds of phosphors outside of the inventive range (Comparative Example 3), and the color purity was superior to the case of only employing the phosphor $ReBO_3:Tb$ (Comparative Example 2). From the results, it is assumed that the relative intensity of the light is varied depending upon the wave length of vacuum ultraviolet which is exciting the phosphor, at each Xe percentage.

As the Xe percentage in the discharge gas increases, the possibility to form a Xe molecular ion increases. Therefore, 173 nm fraction which emits light from the Xe molecular ion increases. Accordingly, at Xe=15%, since the relative strength was increased with a 173 nm exciting source over

TABLE 1

| | $Zn_2SiO_4:Mn$ amount x (wt.%) | $(Ba, Sr, Mg)O.$ $Al_2O_3:Mn$ amount y (wt. %) | $ReBO_3:Tb$ amount z (wt. %) | Xe percentage a (%) | x + y + az | Color coordinate x | Color coordinate y | Relative brightness (%) |
|---|---|---|---|---|---|---|---|---|
| Ref. Ex. 1 | — | — | 100 | 5 | 1500 | 0.314 | 0.621 | 100 |
| Ref. Ex. 2 | 10 | 20 | 70 | 5 | 380 | 0.285 | 0.648 | 85 |
| Ref. Ex. 3 | 0 | — | 70 | 5 | 380 | 0.292 | 0.649 | 93 |
| Ref. Ex. 4 | 0 | 10 | 20 | 5 | 180 | 0.248 | 0.698 | 93 |
| Ref. Ex. 5 | 0 | — | 30 | 5 | 220 | 0.261 | 0.686 | 97 |
| Ref. Ex. 6 | 100 | — | — | 5 | 100 | 0.237 | 0.716 | 110 |

TABLE 2

| | $Zn_2SiO_4:Mn$ amount x (wt.%) | $(Ba, Sr, Mg)O.$ $Al_2O_3:Mn$ amount y (wt. %) | $ReBO_3:Tb$ amount z (wt. %) | Xe percentage a (%) | x + y + az | Color coordinate x | Color coordinate y | Relative brightness (%) |
|---|---|---|---|---|---|---|---|---|
| Com. Ex. 1 | — | — | 100 | 15 | 1500 | 0.288 | 0.647 | 123 |
| Ex. 1 | 10 | 20 | 70 | 15 | 1080 | 0.275 | 0.660 | 116 |
| Ex. 2 | 30 | — | 70 | 15 | 1080 | 0.270 | 0.669 | 120 |
| Ex. 3 | 70 | 10 | 20 | 15 | 380 | 0.244 | 0.704 | 110 |
| Ex. 4 | 70 | — | 30 | 15 | 520 | 0.254 | 0.694 | 116 |
| Com. Ex. 2 | 100 | — | — | 15 | 100 | 0.246 | 0.707 | 100 |
| Com. Ex. 3 | 70 | 25 | 5 | 15 | 170 | 0.236 | 0.712 | 82 |

The relative brightness of the three kinds of green phosphors may be varied depending upon the composition of the discharge gas. Supposing that the brightness of the phosphor $ReBO_3:Tb$ is 100% at a 4–5% Xe percentage, the brightness of the phosphor $Zn_2SiO_4:Mn$ is 110%, and that of the phosphor $(Ba,Sr,Mg)O.Al_2O_3:Mn$ is 65%. However, supposing that the brightness of the phosphor $ReBO_3:Tb$ is 100% at 6% or more of the Xe percentage, the brightness of the phosphor $Zn_2SiO_4:Mn$ is 80~90%, and that of the phosphor $(Ba,Sr,Mg)O.Al_2O_3:Mn$ is 22~40%. As described in the above, as the Xe percentage gets higher, the relative brightness of the green phosphor $ReBO_3:Tb$ becomes higher than those of other green phosphors.

As described in Table 1, under the condition that the Xe percentage is 5%, when the green phosphor was prepared by mixing $Zn_2SiO_4:Mn$ with $ReBO_3:Tb$ and optionally $(Ba,Sr,Mg)O.Al_2O_3:Mn$ (Reference Examples 2 to 5), the relative brightness thereof was lower than in the case of employing one single phosphor (Reference Example 1). However, under the condition that the Xe percentage is 15% as shown in Table 2, when the green phosphor was prepared by mixing $Zn_2SiO_4:Mn$ with $ReBO_3:Tb$ and optionally $(Ba,Sr,Mg)$ $O.Al_2O_3:Mn$ in a range of $200 \leq x+y+az \leq 2130$ (Examples 1 to 4), the relative brightness was higher than in the case of employing one single phosphor $Zn_2SiO_4:Mn$ (Comparative the case of the 147 nm exciting source, it was established that the green phosphor $ReBO_3:Tb$ has a more important roll in exhibiting a green color than the case of Xe=5%.

The target of the phosphor powders of $Zn_2SiO_4:Mn$, $(Ba,Sr,Mg)O.Al_2O_3:Mn$, and $ReBO_3:Tb$ were subjected to sputtering at a supply power of 5W for 10 minutes under the Ar ion attachment, the brightness retention rate were measured, and the results are as follows: $Zn_2SiO_4:Mn$ was 57%, $(Ba,Sr,Mg)O.Al_2O_3:Mn$ was 89%, and $ReBO_3:Tb$ was 92%. As the present invention utilizes a relatively high amount of $ReBO_3:Tb$ having a good brightness retention rate, it is possible to improve the lifespan of green phosphor.

As the plasma display panel of the present invention employs discharge gases having a high Xe percentage, the photoemission efficiency was improved, and the brightness and lifespan characteristics were remarkably improved by increasing the amount of rare earth element-based green phosphor in proportion to the increase of the Xe percentage. As the green brightness is the highest percentage in white brightness, the plasma display panel is improved by improving the green brightness. Further, the plasma display panel has improved discharge stability, color purity, and persistence characteristics, by employing the mixture of three kinds of green phosphors.

What is claimed is:

1. A plasma display panel comprising:
   a pair of substrates having a transparent front surface and disposed to leave a discharge space therebetween;
   a plurality of barrier ribs disposed on one substrate to partition the discharge space into a plurality of respective green discharge spaces, blue discharge spaces and red discharge spaces;
   a group of electrodes disposed on the substrates to generate discharge in the discharge spaces partitioned by the barrier ribs;
   a phosphor layer formed in the discharge spaces, the phosphor layer being a green phosphor layer for the green discharge spaces, a blue phosphor layer for the blue phosphor discharge spaces, and a red phosphor layer for the red discharge spaces; and
   a discharge gas filled in the discharge space,
   wherein each green phosphor layer comprises from 10 to 70% by weight of a first green phosphor selected from the group consisting of $Zn_2SiO_4$:Mn, $(Zn, A)_2SiO_4$;Mn where A is an alkali metal, and mixtures thereof; from 0 to 30% by weight of a second green phosphor selected from the group consisting of $(Ba, Sr, Mg)O \cdot aAl_2O_3$:Mn where a is from 1 to 23, $LaMgAl_xO_y$:Tb,Mn where x is from 1 to 14 and y is from 8 to 47, and mixtures thereof; and from 20 to 70% by weight of a third green phosphor selected from the group consisting of $ReBO_3$:Tb where Re is at least one rare earth element selected from the group consisting of Sc, Y, La, Ce, and Gd,
   wherein the discharge gas comprises at least 6% by weight of Xe based on the total weight of the discharge gas.

2. The plasma display panel according to claim 1, wherein the discharge gas comprises from 6 to 50% of Xe based on the total weight of the discharge gas.

3. The plasma display panel according to claim 2, wherein the discharge gas comprises from 6 to 30% of Xe based on the total weight of the discharge gas.

4. The plasma display panel according to claim 3, wherein the discharge gas comprises from 7 to 20% of Xe based on the total weight of the discharge gas.

5. The plasma display panel according to claim 4, wherein the discharge gas comprises from 10 to 20% of Xe based on the total weight of the discharge gas.

6. The plasma display panel according to claim 5, wherein the discharge gas comprises from 10 to 15% of Xe based on the total weight of the discharge gas.

7. The plasma display panel according to claim 1, wherein the green phosphor comprises from 20 to 60% by weight of a first green phosphor; from 5 to 25% by weight of a second green phosphor; and from 25 to 65% by weight of a third green phosphor.

8. The plasma display panel according to claim 1, wherein the amounts of the phosphors and the discharge percentage are represented by:
   $200 \leq x+y+az \leq 2130$
   where x is the amount of the first green phosphor, y is the amount of the second green phosphor, z is the amount of the third green phosphor, and a is the Xe percentage in the total discharge gas.

9. The plasma display panel according to claim 8, wherein the amounts of the phosphors and the discharge percentage are represented by:
   $380 \leq x+y+az \leq 2130$.

10. The plasma display panel according to claim 9, wherein the amounts of the phosphors and the discharge percentage are represented by:
    $520 \leq x+y+az \leq 1080$.

11. A plasma display panel green cell comprising:
    a discharge space formed between a pair of substrates by barrier ribs separating adjacent discharge spaces;
    a green phosphor layer formed in the discharge space, the phosphor layer including from 10 to 70% by weight of a first green phosphor selected from the group consisting of $Zn_2SiO_4$:Mn, $(Zn, A)_2SiO_4$;Mn where A is an alkali metal, and mixtures thereof; from 0 to 30% by weight of a second green phosphor selected from the group consisting of $(Ba, Sr, Mg)O \cdot aAl_2O_3$:Mn where a is from 1 to 23, $LaMgAl_xO_y$:Tb,Mn where x is from 1 to 14 and y is from 8 to 47, and mixtures thereof; and from 20 to 70% by weight of a third green phosphor selected from the group consisting of $ReBO_3$:Tb where Re is at least one rare earth element selected from the group consisting of Sc, Y, La, Ce, and Gd; and
    a discharge gas inserted in the discharge space comprising at least 6% of Xe based on the total weight of the discharge gas.

12. The plasma display panel according to claim 11, wherein the discharge gas comprises from 6 to 50% of Xe based on the total weight of the discharge gas.

13. The plasma display panel according to claim 12, wherein the discharge gas comprises from 6 to 30% of Xe based on the total weight of the discharge gas.

14. The plasma display panel according to claim 13, wherein the discharge gas comprises from 7 to 20% of Xe based on the total weight of the discharge gas.

15. The plasma display panel according to claim 14, wherein the discharge gas comprises from 10 to 20% of Xe based on the total weight of the discharge gas.

16. The plasma display panel according to claim 15, wherein the discharge gas comprises from 10 to 15% of Xe based on the total weight of the discharge gas.

17. The plasma display panel according to claim 11, wherein the amount of the first green phosphor is from 20 to 60% by weight; the amount of the second green phosphor is from 5 to 25% by weight; and the amount of the third green phosphor is from 25 to 65% by weight.

18. The plasma display panel according to claim 11, wherein the amounts of the phosphors and the discharge percentage are represented by:
    $200 \leq x+y+az \leq 2130$
    where x is the amount of the first green phosphor, y is the amount of the second green phosphor, z is the amount of the third green phosphor, and a is the Xe percentage in the total discharge gas.

19. The plasma display panel according to claim 18, wherein the amounts of the phosphors and the discharge percentage are represented by:
    $380 \leq x+y+az \leq 2130$.

20. The plasma display panel according to claim 19, wherein the amounts of the phosphors and the discharge percentage are represented by:
    $520 \leq x+y+az \leq 1080$.

* * * * *